US010068213B2

(12) United States Patent
Groarke et al.

(10) Patent No.: US 10,068,213 B2
(45) Date of Patent: Sep. 4, 2018

(54) SYSTEMS AND METHODS FOR FACILITATING CROSS-PLATFORM PURCHASE REDIRECTION

(71) Applicant: MasterCard International Incorporated, Purchase, NY (US)

(72) Inventors: Peter J. Groarke, Dublin (IE); Ahmed Hosny, Dublin (IE); John McGuire, Spiddal Co. Galway (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 348 days.

(21) Appl. No.: 14/849,224

(22) Filed: Sep. 9, 2015

(65) Prior Publication Data
US 2017/0068939 A1  Mar. 9, 2017

(51) Int. Cl.
*G06Q 20/10* (2012.01)
*G06Q 20/20* (2012.01)
*G06Q 20/12* (2012.01)

(52) U.S. Cl.
CPC ........ *G06Q 20/20* (2013.01); *G06Q 20/123* (2013.01)

(58) Field of Classification Search
CPC .. G06Q 30/0641; G06Q 20/367; G06Q 20/20; G06Q 20/36; G06Q 20/04; G06Q 30/00; H04L 63/18; H04L 67/2814
See application file for complete search history.

(56) References Cited

U.S. PATENT DOCUMENTS

| 7,647,252 B2 * | 1/2010 | Rampell ............ G06Q 30/0207 705/26.4 |
| 7,720,763 B2 | 5/2010 | Campbell et al. |
| 8,799,087 B2 * | 8/2014 | Martin ................ G06Q 20/204 235/375 |
| 8,799,152 B2 * | 8/2014 | Keresman, III ....... G06Q 20/02 705/39 |

(Continued)

OTHER PUBLICATIONS

Abdellaoiu, Refka; Pasquet, Mac; Bethelier, Olivier; "Integration of New Electronic Payment systems into B2C Internet Commerce", IEEE, 2011, pgs. 484-491.*

*Primary Examiner* — Mohammad Z Shaikh
(74) *Attorney, Agent, or Firm* — Armstrong Teasdale LLP

(57) ABSTRACT

A purchase platform redirection (PPR) computing device is provided, the PPR computing device configured to receive a checkout request associated with a transaction initiated at an initial purchase platform by an account-holder. The checkout request includes an identifier of the initial purchase platform and an account-holder account identifier of the account-holder's payment account. The PPR computing device is also configured to determine that the initial purchase platform is not a recommended purchase platform, and determine, using at least the account-holder account identifier, whether the recommended purchase platform is available to the account-holder. The PPR computing device is further configured to generate a redirection message including contact information associated with the account-holder for the recommended purchase platform, if the recommended purchase platform is available, and facilitate transmission of the redirection message, further including a link for the account-holder to complete the transaction at the recommended purchase platform, to the account-holder.

20 Claims, 8 Drawing Sheets

(56) References Cited

U.S. PATENT DOCUMENTS

| | | | |
|---|---|---|---|
| 8,905,303 B1* | 12/2014 | Ben Ayed | G06Q 20/223 235/375 |
| 2009/0034806 A1 | 2/2009 | Yang et al. | |
| 2010/0049654 A1* | 2/2010 | Pilo | G06Q 20/02 705/43 |
| 2010/0299225 A1* | 11/2010 | Aarni | G06Q 20/20 705/27.2 |
| 2011/0161201 A1 | 6/2011 | Stocker | |
| 2012/0078791 A1* | 3/2012 | Huang | G06Q 20/02 705/44 |
| 2013/0091061 A1* | 4/2013 | Caulkett | G06Q 20/02 705/65 |
| 2013/0211934 A1* | 8/2013 | Balasubramanian | G06Q 20/027 705/16 |
| 2013/0246199 A1 | 9/2013 | Carlson | |
| 2013/0246266 A1 | 9/2013 | Coleman et al. | |
| 2014/0229270 A1* | 8/2014 | Rashwan | G06Q 30/0641 705/14.43 |
| 2014/0379558 A1* | 12/2014 | Waskom | G06Q 20/027 705/39 |
| 2015/0032627 A1* | 1/2015 | Dill | G06Q 20/385 705/44 |
| 2015/0039457 A1* | 2/2015 | Jacobs | G06Q 20/22 705/26.1 |
| 2015/0327071 A1* | 11/2015 | Sharma | H04W 12/12 726/6 |
| 2016/0117675 A1* | 4/2016 | Celikyilmaz | H04L 67/2814 705/44 |
| 2016/0180322 A1* | 6/2016 | Song | G06Q 40/00 705/44 |
| 2016/0224981 A1* | 8/2016 | Radu | G06Q 20/40 |
| 2017/0032366 A1* | 2/2017 | Kumar | G06Q 20/382 |
| 2017/0068939 A1* | 3/2017 | Groarke | G06Q 20/123 |

* cited by examiner

SYSTEMS AND METHODS FOR FACILITATING CROSS-PLATFORM PURCHASE REDIRECTION

BACKGROUND OF THE DISCLOSURE

This invention relates generally to secure payment card transactions and, more particularly, to facilitating cross-platform purchase redirection during payment card transaction processing.

Over the past several years, e-commerce has increased to the point at which over one million dollars of e-commerce transactions occur about every 30 seconds. Understandably, many merchants now provide virtual purchase platforms (in addition to in-person, brick-and-mortar purchase platforms), offering merchant-run websites (both desktop and mobile versions) and downloadable software applications that allow consumers to browse their stores and purchase goods simply and conveniently. In some aspects, these digital outlets are preferable. The merchant need not maintain as many storefronts nor employ as many people. Some merchants even offer online-exclusive products, services, and offers, to entice consumers to make their purchases on these online purchase platforms. However, the rise in e-commerce has led to a rise in online fraud, including, for example, credit card fraud. Consumers' card numbers, account numbers, and personal information are vulnerable, as are their identities. Fraudsters can use illegally obtained card numbers to make purchases online with relative impunity and ease. It is much more difficult to steal a physical credit card and assume a person's identity in person than it is to enter a credit card number into an online checkout form; this is particularly true in cases where EMV security requiring a personal PIN is required for card-present transactions. In many cases, the fraud liability for in-person or "card present" purchases made with a physical payment card is assumed by the issuer of the payment card, as these transactions may be considered more secure, whereas the fraud liability for online or "card not present" (CNP) purchases may frequently be assumed by the merchant.

Accordingly, at least some security measures have been put in place, by merchants, payment card processors, and issuers of payment cards and payment accounts. Some modes of payment may include certain security measures while other modes may not include these security measures. It would be desirable to have a system that redirects a transaction from an initial (e.g., less secure) purchase platform to a recommended (e.g., more secure) purchase platform.

BRIEF DESCRIPTION OF THE DISCLOSURE

In one aspect, a purchase platform redirection (PPR) computing device is described. The PPR computing device includes a processor communicatively coupled to a memory. The processor is programmed to receive a checkout request associated with a transaction initiated at an initial purchase platform by an account-holder. The checkout request includes a purchase platform identifier of the initial purchase platform and an account-holder account identifier of a payment account of the account-holder. The processor is further programmed to determine that the initial purchase platform is not a recommended purchase platform, and determine, using at least the account-holder account identifier, whether the recommended purchase platform is available to the account-holder. The processor is also programmed to generate a redirection message including contact information associated with the account-holder for the recommended purchase platform, if the recommended purchase platform is available, and facilitate transmission of the redirection message, further including a link, to the account-holder, such that the account-holder may complete the transaction at the recommended purchase platform.

In another aspect, a computer-based method for facilitating redirection cross-platform purchase redirection is provided. The method is implemented using a purchase platform redirection (PPR) computer device including a processor and a memory. The method includes receiving a checkout request associated with a transaction initiated at an initial purchase platform by an account-holder. The checkout request includes a purchase platform identifier of the initial purchase platform and an account-holder account identifier of a payment account of the account-holder. The method also includes determining that the initial purchase platform is not a recommended purchase platform, and determining, using at least the account-holder account identifier, whether the recommended purchase platform is available to the account-holder. The method further includes generating a redirection message including contact information associated with the account-holder for the recommended purchase platform, if the recommended purchase platform is available, and facilitating transmission of the redirection message to the account-holder. The redirection message further includes a link such that the account-holder may complete the transaction at the recommended purchase platform.

In yet another aspect, at least one non-transitory computer-readable storage media having computer-executable instructions embodied thereon is described. When executed by at least one processor, the computer-executable instructions cause the processor to receive a checkout request associated with a transaction initiated at an initial purchase platform by an account-holder, the checkout request including a purchase platform identifier of the initial purchase platform and an account-holder account identifier of a payment account of the account-holder. The computer-executable instructions also cause the processor to determine that the initial purchase platform is not a recommended purchase platform, and determine, using at least the account-holder account identifier, whether the recommended purchase platform is available to the account-holder. The computer-executable instructions further cause the processor to generate a redirection message including contact information associated with the account-holder for the recommended purchase platform, if the recommended purchase platform is available, and facilitate transmission of the redirection message to the account-holder, the redirection message further including a link such that the account-holder may complete the transaction at the recommended purchase platform.

In another aspect, a merchant server including a processor communicatively coupled to a memory is provided. The merchant server is configured to receive a checkout request associated with a transaction initiated at an initial purchase platform by an account-holder. The checkout request includes a purchase platform identifier of the initial purchase platform and an account-holder account identifier of a payment account of the account-holder. The merchant server is further configured to transmit the checkout request to a purchase platform redirection (PPR) computing device to determine, using at least the account-holder account identifier, whether a recommended purchase platform is available to the account-holder. The merchant server is also configured to receive a redirection message from the PPR computing device including contact information for the account-holder associated with a recommended purchase platform, if the recommended purchase platform is available, and transmit, using the received contact information, the redirection message to the account-holder. The redirection message further includes a link such that the account-holder may complete the transaction at the recommended purchase platform.

BRIEF DESCRIPTION OF THE DRAWINGS

FIG. 1 is a schematic diagram illustrating an example multi-party transaction card industry system for authorizing payment card transactions and, more specifically, for facilitating redirection of a transaction from an initial purchase platform to a recommended purchase platform.

FIG. 2 is a simplified block diagram of an example secure shopping management system for facilitating cross-platform purchase redirection using a purchase platform redirection (PPR) computing device.

FIG. 3 illustrates an example configuration of a user system operated by a user such as the account-holder shown in FIG. 1.

FIG. 4 illustrates an example configuration of a server system such as the PPR computing device shown in FIG. 2.

FIG. 5 is a simplified diagram illustrating the flow of data between various components of the secure shopping management system shown in FIG. 2.

FIG. 6 is a diagram of an example database, such as the database shown in FIG. 2, including data associated with an account-holder.

FIG. 7 is a flowchart of an example method for facilitating cross-platform purchase redirection.

FIG. 8 shows a diagram of components of an example computing device that may be used in the system shown in FIG. 2 to facilitate cross-platform purchase redirection.

Like numbers in the Figures indicate the same or functionally similar components.

DETAILED DESCRIPTION OF THE DISCLOSURE

Figure 1:
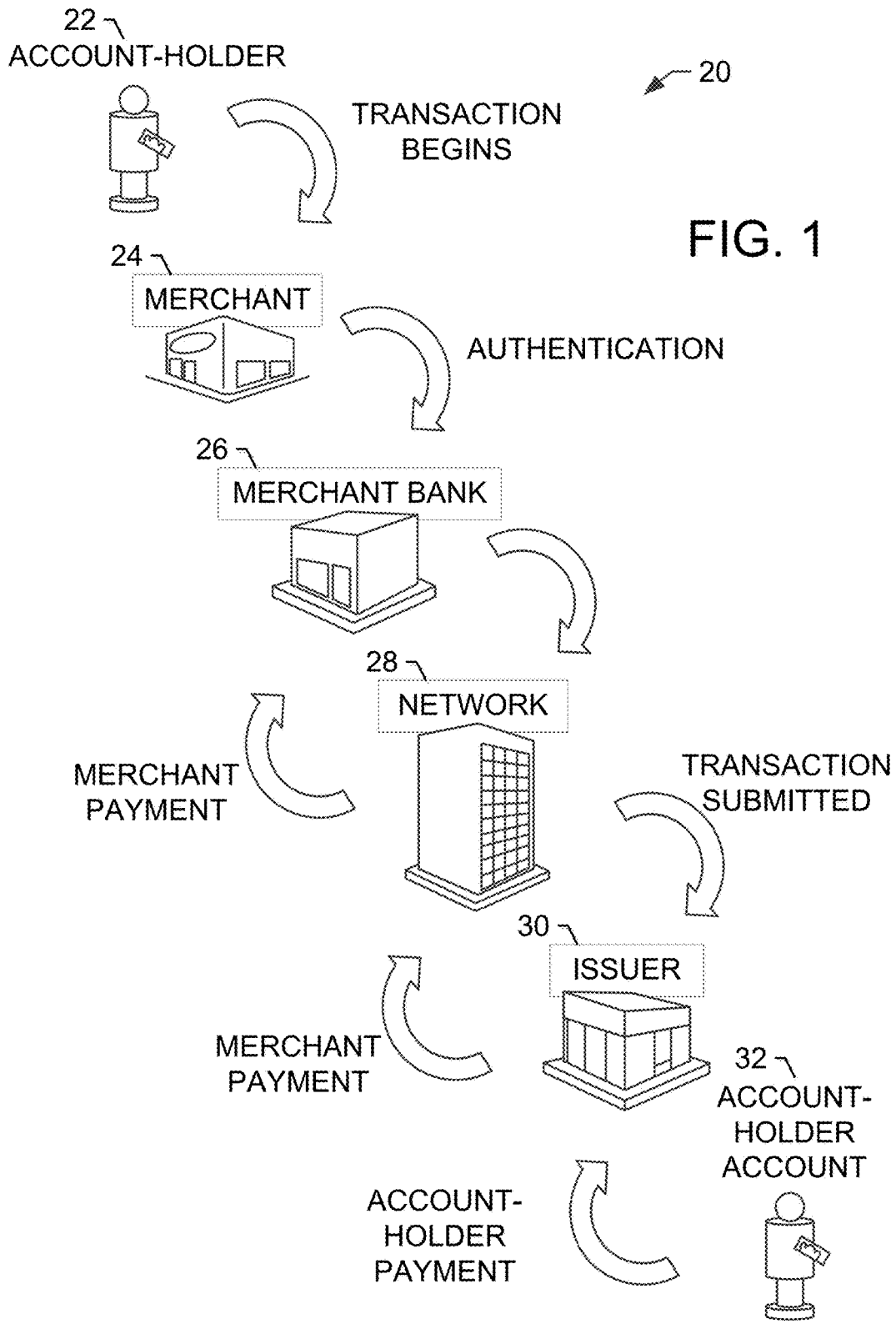
FIGS. 1-8 show example embodiments of the methods and systems described herein.

The secure shopping management system described herein includes a purchase platform redirection (PPR) computing device in communication with a transaction processor configured to process payment transactions and/or a database that stores data related to the transactions ("transaction data"). Transactions include payment transactions initiated by an account-holder using a payment device (e.g., a payment card, digital wallet, mobile payment, etc.) associated with a particular transaction processing network. Transaction data may include, among other data points, data associated with the account-holder and the merchant involved in the payment transaction. For example, transaction data may include one or more of: an account-holder identifier, a merchant identifier, account-holder account data, a transaction amount, a time and date of the transaction, data descriptive of the purchase, and a location of the transaction.

Certain transactions may be considered more secure or less secure based in part on the purchase platform over which the transaction is conducted. For example, some issuers have put in place a token system, in which a mobile device (e.g., a smart phone, tablet, PDA, or wearable) is provisioned a token that associates the mobile device with a payment account without having to provide the actual account number. In some cases, the token is a randomly assigned personal account number (PAN). During a transaction initiated using a "tokenized device," the token is provided in an authentication or authorization message and is mapped back to the account, without the PAN of the actual payment account ever being provided. These tokenized devices offer further enhanced security in that the token is locked to the particular device. If the token is compromised (e.g., the device is lost or stolen), it can immediately be "de-activated" without the need for the consumer to be issued a new physical card or a new account number, which is a benefit and convenience for the consumer, as well. In addition, some issuers offer chip cards, such as EMV® cards (EMV is a registered trademark of EMVCo, LLC, Foster City, Calif.). These chip cards include an embedded microchip, which not only stores card data securely but provides single-use codes that are unique for every transaction, which are communicated between a point-of-sale (POS) device and the chip card. It should be understood that such a tokenized device and/or chip card may be considered more secure than a non-tokenized device or non-chip card, respectively, to merchants and/or issuers, and as such may be "recommended" payment devices or purchase platforms of merchants, issuers, payment processing companies, and even consumers. A recommended payment device or purchase platform includes, in the example embodiment, a more secure payment device or purchase platform. Recommended purchase platforms may be defined or identified by any party in a transaction, including a merchant, an issuer, a payment processing network, an acquirer, and/or an account-holder making the transaction.

The PPR computing device includes a processor in communication with a memory. The PPR computing device is further in communication with at least one database for storing information, such as account-holder identifiers and/or account-holder account identifiers, which identify an account-holder account and all payment methods (e.g., physical card, chip card, tokenized device) associated with that payment account. The account-holder account identifiers may include device identifiers associated with each payment methods, such as a phone number, email address, card number, token, or other similar contact information associated with a device or a user of the device. In the example embodiment, as some of the information stored on the database may include personally identifiable information (PII), any stored PII is encrypted to prevent unauthorized access to the PII. Moreover, in any embodiments in which PII may be collected, the consumer from which the PII may be collected is provided an opportunity to agree to or deny collection of such data.

The secure shopping management system is configured to facilitate cross-platform purchase redirection. In particular, the PPR computing device is configured to process a checkout request for a transaction initiated at an initial purchase platform and determine whether there is an alternative, recommended purchase platform for the transaction. For example, the PPR computing device may use an account-holder identifier included in the checkout request to determine if there is a more secure purchase platform, as defined by the merchant or issuer, available to the user that initiated the transaction. If such a recommended purchase platform is available, the PPR computing devices provides account-holder contact information associated with the recommended purchase platform such that a user may be prompted or notified to use the recommended purchase platform to complete the transaction. The PPR computing device may additionally provide account-holder contact information associated with the initial purchase platform, such that the prompt or notification may be additionally or alternatively be transmitted to the account-holder over the initial purchase platform. If no recommended purchase platform is available, or if the initial purchase platform is the recommended purchase platform, the PPR computing device may transmit a message to the merchant indicating that there is no available recommended purchase platform (e.g., no available purchase platform that is more secure than the initial purchase platform) or may take no action and allow the transaction to proceed on the initial purchase platform.

For example, a particular account-holder may have a payment account (e.g., a credit card account) for which a physical payment card has been issued. As used herein, an "account-holder" is a consumer having a payment card (e.g., a credit card, debit card, prepaid card, etc.) associated with a particular payment processing network (also referred to herein as a "transaction processing network") and/or another payment device with electronically stored account or payment details, such as a digital wallet or mobile payment service. In a first case, the payment card does not have a chip. However, the account-holder also has a tokenized mobile device associated with the payment account, as described above. The account-holder may attempt to make a purchase on a merchant website from their desktop computer (the "initial purchase platform"). For a typical online transaction on a desktop merchant website purchase platform, fraud liability for certain aspects of the transaction may be assumed by the merchant, as described above, as the transaction may be less secure. The account-holder enters their credit card information during a checkout process on the merchant website to purchase the items in their virtual cart. When the user submits the transaction, a merchant server transmits a checkout request. A "checkout request" may include initiation of any checkout processing implemented by the merchant, including, for example, input of user account credentials, authentication of the account-holder, and/or authentication of the user computing device. If the checkout request includes account-holder and/or device authentication, the checkout request may be received by an authentication service. For example, some known payment networks engage an authentication service such as a 3-D Secure® (Visa International Service Association, Delaware) (3DS) protocol (e.g., MasterCard SecureCode® (MasterCard International Incorporated, Purchase, N.Y.)) that performs an authentication of a consumer (e.g., an account-holder) prior to authorization of the transaction.

In this example, the checkout request includes an account-holder identifier, which may be the credit card number (in an encrypted format), a PAN, an address associated with the account-holder, or any other identifier of the account-holder and/or the account-holder's payment account, as well as a purchase platform identifier. The purchase platform identifier may be transmitted to the PPR computing device via an extension message to the 3DS protocol (e.g., an XML-formatted message). The purchase platform identifier, which may be formatted as an extension to an authentication protocol as described above, identifies the purchase platform from which the transaction initiated. Accordingly, in some cases, the purchase platform identifier may include device information associated with the initial purchase platform. Device information may include information about the user computing device used during initiation of the transaction, such as a unique hardware identifier, or an IP address associated with the device. The checkout request may further include a "cart identifier" (or "cart ID"), which is a unique token associated with the account-holder's cart (e.g., the particular items being purchased, the particular step in the checkout process at which the checkout request was initiated, user profile information for a profile associated with the merchant, etc.).

In some embodiments, the PPR computing device may be associated with an authentication service, the transaction processing network, or an issuer. The PPR computing device is configured to receive the checkout request, for example, from a transaction processor included within the transaction processing network or from the merchant server, through a checkout Application Programming Interface (API), which communicatively couples the merchant server and/or the transaction processing network to the PPR computing device. The PPR computing device receives the checkout request including the account-holder identifier and the purchase platform identifier. Using, for example, a lookup table, the PPR computing device determines whether any other purchase platforms are available to the account-holder. The PPR computing device, in this case, determines that an in-person purchase platform, using the physical credit card, is available to the user, as well as a tokenized mobile device. The PPR computing device may use merchant-specific or issuer-specific rules to identify which, if any, of the available purchase platforms are recommended (i.e., by merchant or issuer). "Recommended" purchase platforms may offer increased security, for example, and/or may provide a fraud liability shift from the merchant to the issuer. In this example, the PPR computing device is configured to identify the tokenized mobile device as the recommended purchase platform as it offers increased security over a convention card-not-present (CNP) browser transaction, and compiles contact information associated with the tokenized device (e.g., a phone number or particular device ID). The PPR computing device provides this contact information in a redirection message. The redirection message may include additional information, such as the cart ID.

In some embodiments, the PPR computing device returns the redirection message to the merchant server through the checkout API. The merchant server may then use the contact information to forward the redirection message to the account-holder. For example, the merchant server may provide a desktop notification requesting that the account-holder complete the purchase using a different purchase platform, and may use the contact information to forward the redirection message to the tokenized device in the form of a text message, email, and/or push notification. The merchant server may also use the contact information to determine a particular preferred method of contact for the account-holder. For example, the merchant server may use the phone number or device ID for the tokenized device to determine whether the account-holder has installed a merchant-specific app ("merchant app") on their tokenized device, in which case a push notification associated with the merchant app may be transmitted. If the account-holder has not installed the merchant app, a text message and/or email may be transmitted.

Included in the redirection message may be a link (e.g., hyperlink, URL, etc.) that includes the cart ID associated with the transaction, such that the account-holder may open the redirection message, select the link, and be navigated back to their cart on the recommended purchase platform. If the redirection message forwarded to the account-holder was formatted as a push notification, the recommended purchase platform to which the account-holder is navigated may be the merchant app, whereas if the redirection message was formatted as a text message or email, the recommended purchase platform may be a mobile version of the merchant website. The link may navigate the account-holder to any step in the checkout process, or may complete the transaction using information already submitted by the account-holder in the initial checkout process on the initial purchase platform as well as any additional security information provided by the recommended purchase platform (in this case, the token associated with the tokenized device). The additional security provided by the tokenized device would be unavailable to the account-holder, the merchant, or the issuer, had the transaction proceeded on the initial purchase platform. By redirecting the account-holder to complete the purchase on the recommended purchase platform, the security of the purchase may be enhanced.

In other embodiments, the PPR computing device may be configured to transmit the redirection message on behalf of the merchant to the tokenized (or non-tokenized, as the case may be) device, through the checkout API. In such embodiments, the redirection message forwarded to the account-holder may be formatted similarly as described above with respect to the merchant server-forwarded redirection message. However, the PPR computing device may not be configured to determine whether the merchant app is installed on the tokenized device, therefore the redirection message may be formatted as a text message and/or an email.

In a second case, the account-holder (who has initiated a purchase on an initial purchase platform of a desktop browser) may have a chip card associated with their payment account. The account-holder may also have a mobile device from which they frequently make purchases, but the mobile device may not be tokenized. In this case, when the PPR computing device receives the checkout request, the PPR computing device may use, for example, the lookup table to identify whether there are any other purchase platforms available to the account-holder (other than the initial purchase platform of the merchant website on the desktop computer). The PPR computing device may identify that the account-holder is using a chip card to make their online purchase. The PPR computing device may return a redirection message to the merchant server with an indication the payment card used by the account-holder is a chip card, which includes enhanced security features for in-person purchases at a merchant POS device. The merchant server may then forward the redirection response to the account-holder, requesting that the account-holder complete the purchase at the recommended purchase platform of a merchant POS device. Alternatively, the PPR computing device, based on merchant-specific configuration rules, may be configured to identify the mobile device as a recommended purchase platform. Because the account-holder frequently uses the mobile device to make purchases, and these previous purchases have been determined to be non-fraudulent, the merchant may be willing to accept liability for the purchase and proceed with the transaction, based on a level of "trust" that the account-holder will continue to make non-fraudulent purchases.

Particularly in the second case, but also for the first case, the inconvenience to the account-holder of accessing and/or using the recommended purchase platform identified in the redirection response may increase the risk of abandonment of the transaction. Accordingly, using the recommended purchase platform may be optional for the account-holder, in either case. Additionally, the merchant may provide offers or incentives to the account-holder for completing the transaction on the recommended purchase platform, including, for example, discounts on the purchase, rewards points, coupons, entry into a drawing for a prize, etc.

In a third case, the account-holder (who has initiated a transaction on an initial purchase platform of a desktop browser) may have two payment accounts associated therewith. The first payment account, which the account-holder has identified as the payment card they wish to use for the initiated transaction, may have a chip card associated therewith. The second payment account may have a non-chip card and a tokenized device associated therewith. During the checkout process, the PPR computing device receives the checkout request including the account-holder identifier and account identifier for the first payment account. The PPR computing device is configured to use, for example, a stored lookup table to determine that the account-holder is also associated with the second payment account, and that the first payment account is associated with the chip card. The PPR computing device may return the contact information for the tokenized device in a redirection message, as well as an indicator that the card associated with the first payment account is a chip card. The redirection message pushed to the account-holder (by the merchant server or, alternatively, by the PPR computing device) may include both potential recommended purchase platforms: the tokenized device and an in-person purchase platform. The redirection message may prompt the account-holder to choose one of the recommended purchase platforms on which to complete the transaction (as described above), although the redirection message may also include an option for the account-holder to proceed on the initial purchase platform.

In some embodiments, the checkout request may only be transmitted to the PPR computing device under certain conditions, such as conditions under which a less secure transaction presents a greater risk to the merchant. For example, the merchant may only wish to initiate purchase platform redirection for transactions over a threshold dollar amount, or for transactions initiated by account-holders having new user accounts with the user or new payment accounts. Different merchants may desire different liability responsibilities and/or different consumer experiences for their customers. For example, for some small merchants who conduct small numbers of transactions, every single transaction is important. Such a merchant may desire the use of more secure purchase platforms and/or liability shift to issuers on most or all transactions. On the other hand, large merchants who conduct large numbers of transactions may accept a certain risk of fraudulent transactions in exchange for the reduced risk of abandoned transactions.

In one embodiment, an acquiring bank may offer or provide this purchase platform redirection process to one or more of their associated merchants, and thus may engage the secure shopping management system to perform this process for those merchant transactions. In other words, the transaction processing network provides this service on behalf of the acquiring banks to the merchants. In another embodiment, merchants may directly engage the transaction processing network to perform this process on behalf of the merchant. In yet another embodiment, a third-party processing service performs this process on behalf of the merchant.

At least one of the technical problems addressed by this system includes: (i) accepting a transaction on a riskier purchase platform due to lack of awareness of more secure purchase platform availability; and (ii) lack of encouragement of consumers to use more secure purchase platform.

A technical effect of the systems and processes described herein is achieved by performing at least one of the following steps: (i) receiving a checkout request associated with a transaction initiated at an initial purchase platform by an account-holder, the checkout request including a purchase platform identifier of the initial purchase platform and an account-holder account identifier of a payment account of the account-holder; (ii) determining that the initial purchase platform is not a recommended purchase platform; (iii) determining, using at least the account-holder account identifier, whether the recommended purchase platform is available to the account-holder; (iv) if the recommended purchase platform is available, generating a redirection message including contact information associated with the account-holder for the recommended purchase platform; and (v) facilitating transmission of the redirection message to the account-holder, the redirection message further including a link such that the account-holder may complete the transaction at the recommended purchase platform.

The technical effect achieved by this system is at least one of: (i) improved cross-platform awareness to facilitate more secure transactions; (ii) providing a system whereby a cross-platform transition of a transaction to a more secure platform can be effected; (iii) enhanced consumer knowledge of more secure purchase platforms; and (iv) convenient transfer of consumers to an available secure purchase platform.

As used herein, the term "authentication" (or an "authentication process") is used generally to refer to a process conducted on a payment transaction prior to the "authorization" of a transaction (or an "authorization process"). At least one purpose of the authentication process is to evaluate whether or not the person conducting the transaction is actually a person privileged to use the payment card presented in the transaction. An authentication process may be used to reduce fraudulent transactions, and thus protect one or more parties to the transaction (e.g., the merchant, or the issuer of the payment card).

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," "payment card," and "payment device" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, digital wallets, and/or computers. Each type of transactions card can be used as a method of payment for performing a transaction. As used herein, the term "payment account" is used generally to refer to the underlying account with the payment device. In addition, account-holder behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction card industry system 20 for authorizing payment card transactions and, more specifically, for facilitating redirection of a transaction from an initial purchase platform to a recommended purchase platform. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are customers of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or account-holder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When account-holder 22 tenders payment for a purchase with a transaction card, merchant 24 requests authorization from a merchant bank 26 for the amount of the purchase. The request may be performed over the telephone, but is usually performed through the use of a point-of-sale terminal, which reads account-holder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether account-holder's 22 account 32 is in good standing and whether the purchase is covered by account-holder's 22 available credit line. Based on these determinations, the request for authorization will be declined or accepted. If the request is accepted, an authorization code is issued to merchant 24.

When a request for authorization is accepted, the available credit line of account-holder's 22 account 32 is decreased. Normally, a charge for a payment card transaction is not posted immediately to account-holder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If account-holder 22 cancels a transaction before it is captured, a "void" is generated. If account-holder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, account-holder account information, a type of transaction, savings information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

In some embodiments, the payment card transaction is a card-not-present transaction initiated by account-holder 22 with a payment device (e.g., a payment card, tokenized device, etc.) on an initial purchase platform. Network 28 includes a purchase platform redirection (PPR) computing device (not separately shown in FIG. 1) that is configured to analyze various data associated with the payment card transaction and provide various services to one or more parties involved in the payment card transaction, such as merchant 24 and issuer 30. In one embodiment, during a checkout process for the payment card transaction, the PPR computing device uses an account-holder identifier included in a checkout request to determine whether there is a more secure (or "recommended") purchase platform available to account-holder 22. If such a recommended purchase platform is available, the PPR computing device returns contact information for account-holder 22 for at least one of the initial purchase platform and the recommended purchase platform in a redirection message to merchant 24, such that merchant 24 may contact account-holder 22 to complete the transaction over the recommended purchase platform. In some embodiments, the redirection message is transmitted as an extension to a 3DS protocol (i.e., in an authentication request). In some embodiments, the PPR computing device transmits the redirection message directly to account-holder 22 over one or both of the initial and the recommended purchase platform(s).

Figure 2:
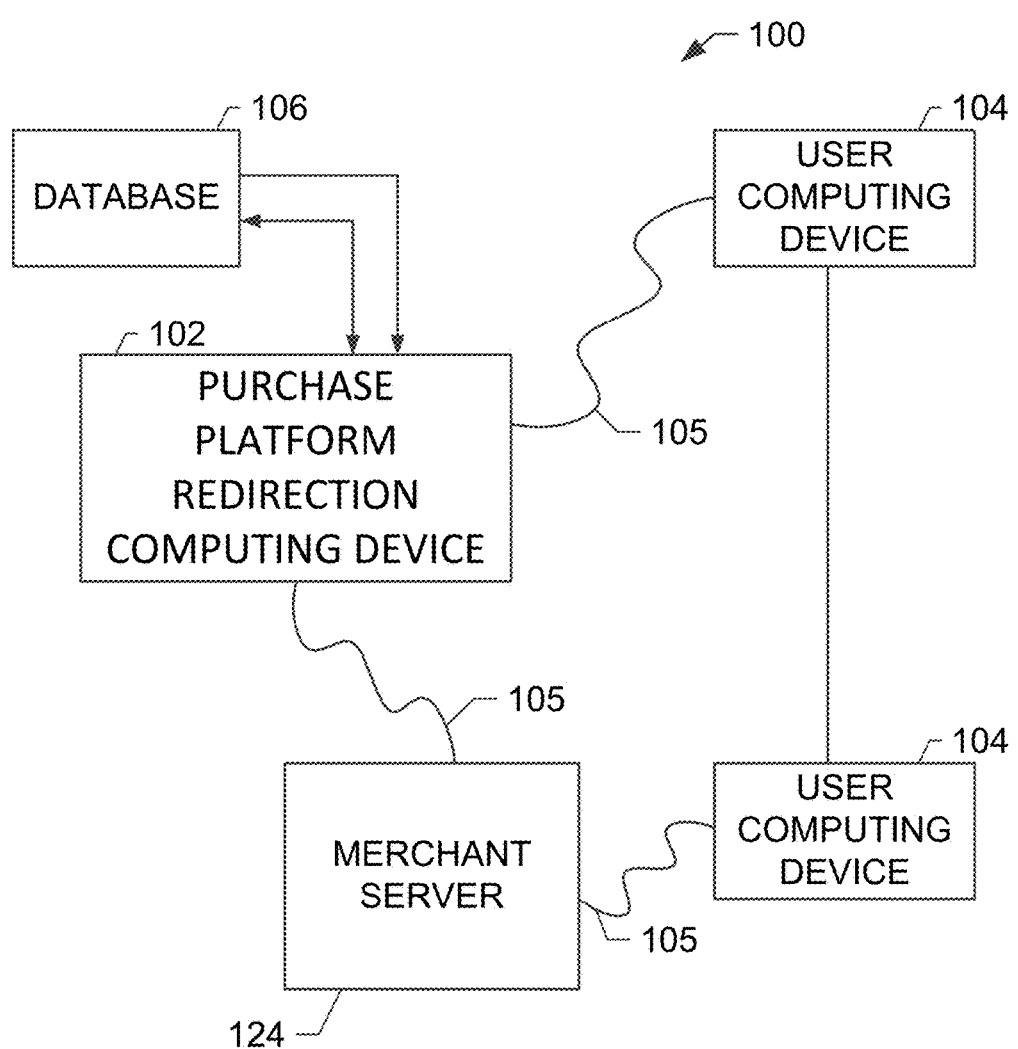

FIG. 2 is a simplified block diagram of an example secure shopping management system 100 for facilitating cross-platform purchase redirection during payment card transaction processing using a purchase platform redirection (PPR) computing device 102. In one embodiment, the platform purchase redirection service may be provided to one or more merchants (e.g., merchant 24, shown in FIG. 1) by a payment processing network (e.g., payment processing network 28, shown in FIG. 1). Accordingly, PPR computing device 102 may be associated with and/or integral to payment processing network 28. In other embodiments, PPR computing device 102 may be associated with and/or integral to a third-party authentication (not shown). In the example embodiment, secure shopping management system 100 includes a plurality of computer devices connected in communication in accordance with the present disclosure. More particularly, secure shopping management system 100 includes PPR computing device 102 in communication with a merchant server 124 associated with merchant 24, and/or user computing device(s) 104 associated with account-holders, merchants, merchant banks, payment networks, and/or issuer banks.

User computing devices 104 could be any device capable of interconnecting to the Internet including a web-based phone, PDA, laptop computer, desktop computer, tablet, "phablet," wearable (e.g., a smart watch), point-of-sale (POS) terminals, or other web-based connectable equipment. In one embodiment, user computing devices 104 are computers including a web browser, such that merchant server 124 and/or PPR computing device 102 are accessible to user computing devices 104 using the Internet. User computing devices 104 are interconnected to the Internet through many interfaces including a network 105, such as a local area network (LAN) or a wide area network (WAN), dial-in-connections, cable modems, special high-speed Integrated Services Digital Network (ISDN) lines, and RDT networks.

In one embodiment, at least one user computing device 104 is a POS terminal 104. POS terminal 104 could be any device capable of interconnecting to the Internet and including an input device capable of reading information from an account-holder's payment card. In some embodiments, POS terminal 104 may be an account-holder's personal computer, such as when conducting an online purchase through the Internet. In other embodiments, POS terminal 104 may be a physical terminal at a merchant location associated with merchant 24 and include an input device capable of reading a magnetic stripe and/or chip on the account-holder's payment card. As used herein, the terms POS device, POS terminal, and point of interaction device are used broadly, generally, and interchangeably to refer to any device at which an account-holder interacts with a merchant to complete a payment card transaction.

PPR computing device 102 is connected to database 106, which contains information on a variety of matters, as described below in greater detail. In one embodiment, centralized database 106 is stored on PPR computing device 102. In an alternative embodiment, database 106 is stored remotely from PPR computing device 102 and may be non-centralized. Database 106 may include a single database having separated sections or partitions or may include multiple databases, each being separate from each other. In the example embodiment, database 106 may store account-holder identifiers and/or account-holder account identifiers, which identify an account-holder account and all payment devices (e.g., physical card, chip card, tokenized device) associated with that payment account. The account-holder account identifiers may include device identifiers associated with each payment methods, such as a phone number, email address, card number, token, or other similar contact information associated with a device or a user of the device. Database 106 may further store contact information associated with the account-holder and payment methods available thereto (e.g., phone number or device ID associated with a tokenized device). Database 106 may store any or all of the above-described information such that the information is searchable and accessible by PPR computing device 102. For example, database 106 may store information associated with each account-holder and/or account-holder payment account in a lookup table. In some embodiments, database 106 may further store configuration parameters or rules associated with particular merchants 24, for redirection messages generated by PPR computing device 102; purchase data associated with purchases made by the account-holder, including purchase dates, and/or corresponding merchants, purchase amounts, and/or descriptions of item(s) purchased.

In the example embodiment, an account-holder initiates a transaction on an initial purchase platform, using one of user computing device 104. Initiation of the transaction causes a checkout request to be sent to merchant server 124. Merchant server 124 forwards the checkout request to PPR computing device 102. PPR computing device 102 is configured to process the checkout request determine whether there is a recommended purchase platform for the transaction (e.g., using another user computing device 104 or another purchase platform on the same user computing device 104). For example, PPR computing device 102 may use an account-holder identifier included in the checkout request to access a lookup table on database 106. PPR computing device 102 determines whether there is a more secure purchase platform available to the account-holder. If such a recommended purchase platform is available, PPR computing device 102 retrieves the contact information for the account-holder associated with at least one of the initial purchase platform and the recommended purchase platform. PPR computing device 102 provides account-holder contact information, for example, to merchant server 124 in a redirection message, such that merchant server 124 may forward the redirection message to the account-holder at one or both of the initial and recommended purchase platform(s). The redirection message prompts or notifies the account-holder to use the recommended purchase platform to complete the transaction.

Figure 3:
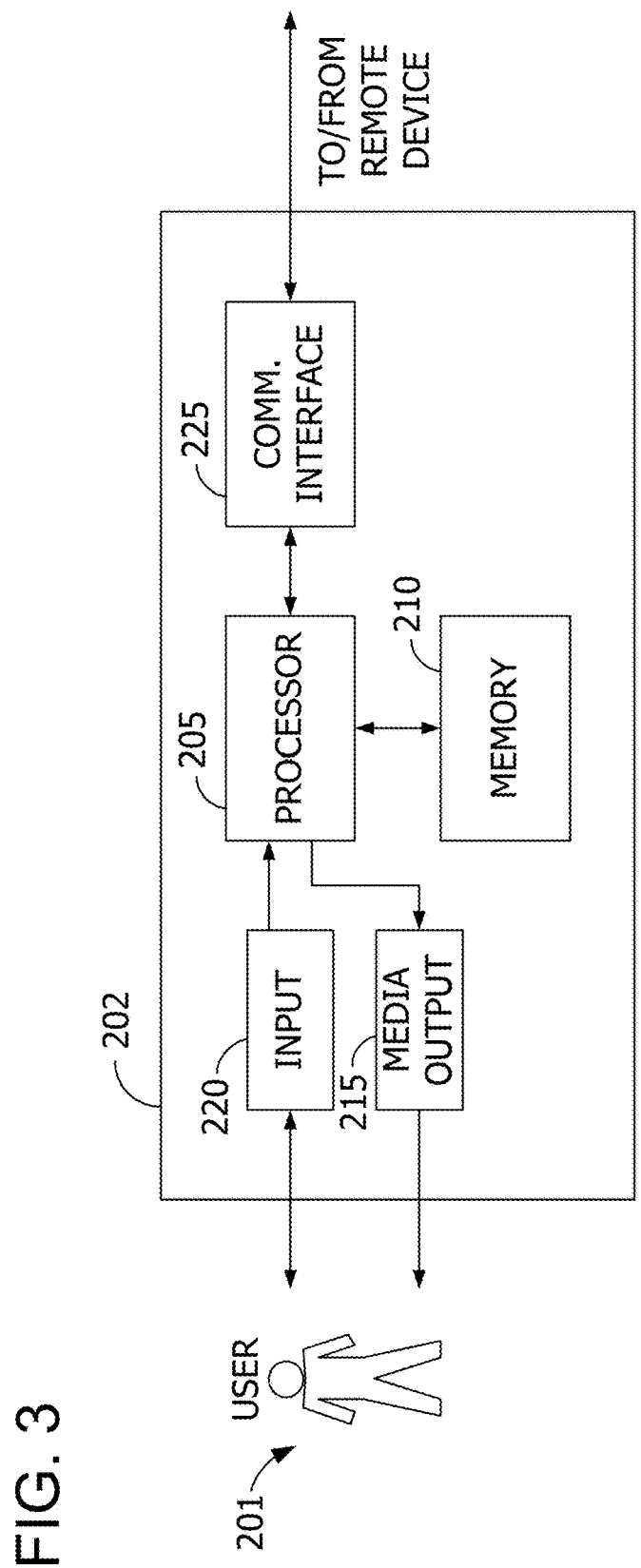

FIG. 3 illustrates an example configuration of a user system 202 operated by a user 201, such as account-holder 22 (shown in FIG. 1). In some embodiments, user system 202 is a user computing device, a merchant system, and/or a POS device. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer-readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as merchant server 124 and/or PPR computing device 102 (shown in FIG. 2). Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from, for example, merchant server 124. A client application allows user 201 to interact with a server application from, for example, merchant server 124.

In the example embodiment, computing device 202 is a user computing device (e.g., user computing device 104, shown in FIG. 2) from which user 201 engages with an online merchant (e.g., merchant 24, shown in FIG. 1), a network (e.g., network 28, shown in FIG. 1), and an issuer of a payment card (e.g., issuer 30, shown in FIG. 1) to perform a transaction that undergoes a purchase platform redirection process implemented by the PPR computing device 102 (shown in FIG. 2).

Figure 4:
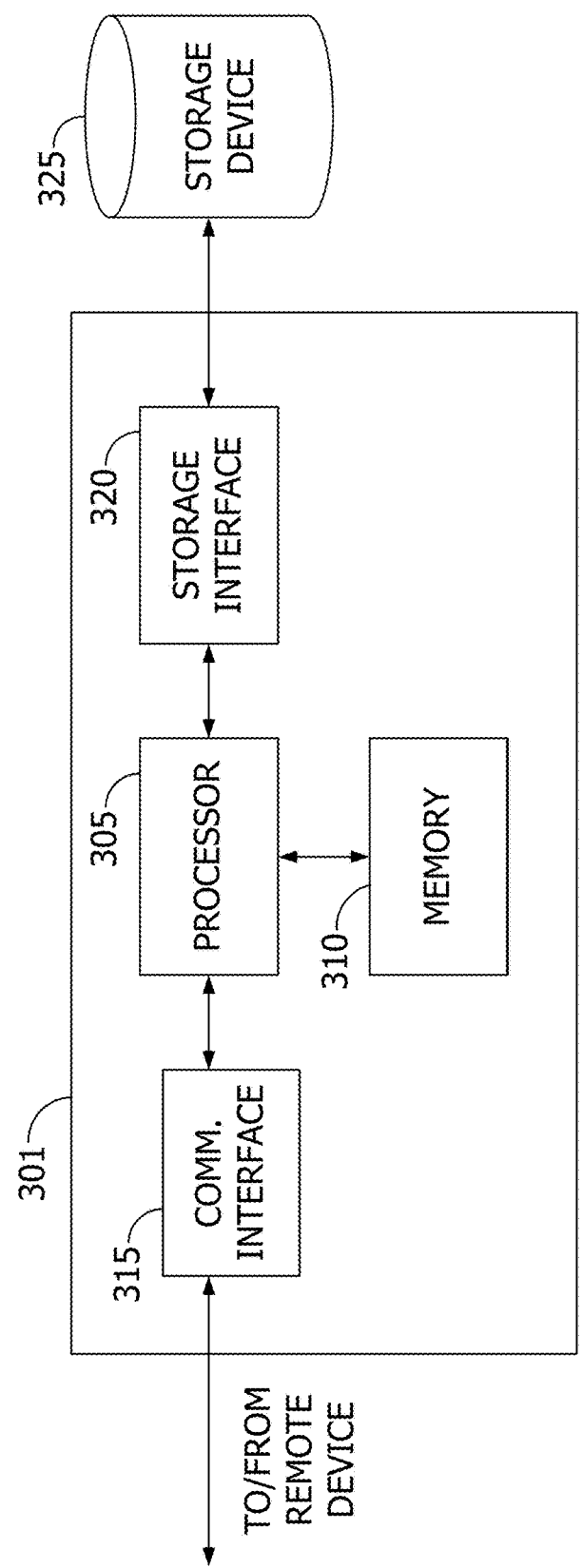

FIG. 4 illustrates an example configuration of a server system 301 included in secure shopping management system 100 (shown in FIG. 2). Server system 301 may include, but is not limited to, merchant server 124 and/or PPR computing device 102 (both shown in FIG. 1).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as user system 202 (shown in FIG. 3) or another server system 301. For example, communication interface 315 may receive requests from a user computing device 104 via the Internet, as illustrated in FIG. 2.

Processor 305 may also be operatively coupled to a storage device 325. Storage device 325 is any computer-operated hardware suitable for storing and/or retrieving data. In some embodiments, storage device 325 is integrated in server system 301. For example, server system 301 may include one or more hard disk drives as storage device 325. In other embodiments, storage device 325 is external to server system 301 and may be accessed by a plurality of server systems 301. For example, storage device 325 may include multiple storage units such as hard disks or solid state disks in a redundant array of inexpensive disks (RAID) configuration. Storage device 325 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 325. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 325.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

In the example embodiment, server system 301 is a PPR computing device 102 in communication with a merchant server 124 during a payment card transaction initiated on an initial purchase platform. PPR computing device 102 processes a checkout request transmitted from merchant server 124 to determine whether there is a recommended (e.g., more secure) purchase platform available to the account-holder. PPR computing device 102 retrieves contact information for the account-holder associated with at least one of the initial purchase platform and the recommended purchase platform and returns the contact information to merchant server 124 in a redirection message. Merchant server 124 forwards the redirection message to the account-holder, using the received contact information, that prompts the account-holder to complete the purchase on the recommended purchase platform.

Figure 5:
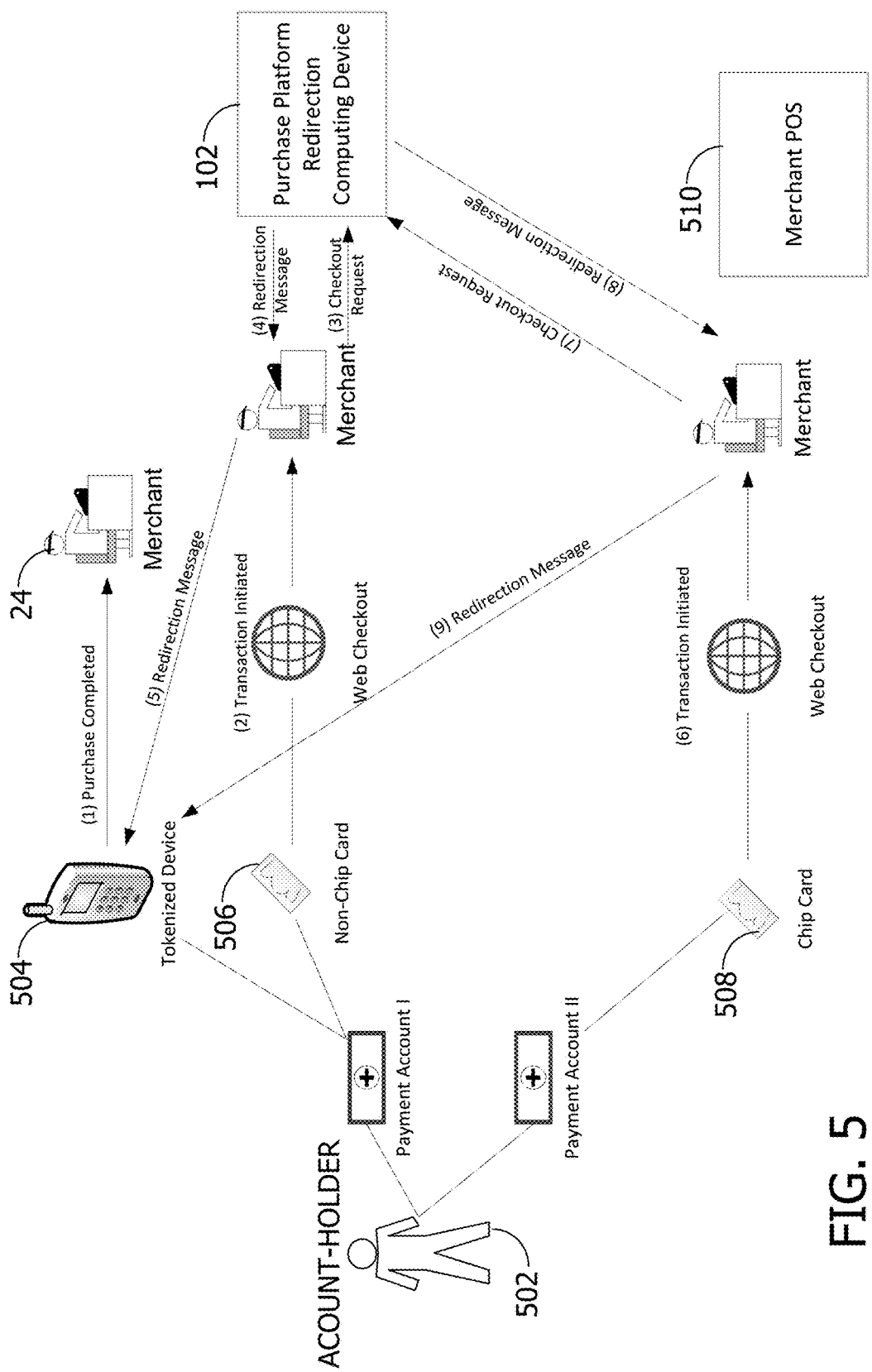

FIG. 5 is a simplified diagram illustrating the flow of data between various components of the secure shopping management system 100, shown in FIG. 2. In the example embodiment, an account-holder 502 (who may be similar to account-holder 22, shown in FIG. 1) has two payment accounts (Payment Account I and Payment Account II) associated therewith. Payment Account I has a tokenized device 504 (which may be similar to user computing device 104, shown in FIG. 2) and a non-chip payment chard 506 associated therewith. Payment Account II has a chip card 508 associated therewith.

In a first case, account-holder 502 initiates a transaction using tokenized device 504 as an initial purchase platform. As described herein, tokenized devices may offer enhanced security over conventional CNP purchases such as those made over a desktop browser, as each transaction includes the unique token associated with that particular device. Accordingly, a merchant 24 (which may include merchant server 124, shown in FIG. 2) receives a checkout request for the initiated transaction and, according to particular transaction-security rules or configuration parameters imposed by merchant 24, accepts the transaction initiated on tokenized device 504 as a secure transaction and the purchase is completed (1).

In a second case, account-holder 502 initiates a transaction (2) using non-chip card 506, with web checkout as an initial purchase platform (e.g., using a desktop browser). Merchant 24 receives a checkout request for the initiated transaction and, according to particular transaction-security rules or configuration parameters imposed by merchant 24, transmits the checkout request (3) to purchase platform redirection (PPR) computing device 102 (as shown in FIG. 2). The checkout request includes at least an account-holder identifier and/or an account-holder account identifier, as well as an initial purchase platform identifier. PPR computing device 102 accesses a memory device (e.g., internal memory and/or a database such as database 106, shown in FIG. 2) to determine the purchase platform(s) available to account-holder 502. PPR computing device 102 uses the account-holder account identifier, which identifies Payment Account I and the payment devices 504, 506 associated therewith, to determine that tokenized device 504 is available as a purchase platform. In the example embodiment, transaction-security rules or configuration parameters imposed by merchant 24 indicate that a tokenized device is a recommended purchase platform to web checkout.

PPR computing device 102 retrieves contact information for account-holder 502 associated with tokenized device 504 (and/or with the initial purchase platform, such as an email address). PPR computing device 102 transmits a redirection message (4) to merchant 24 including the contact information and an identifier of the recommended purchase platform (tokenized device 504). Merchant 24 forwards the redirection message (5) to account-holder 502, more particularly, to tokenized device 504. The forwarded redirection message may be formatted as an email, text message, push notification, and/or any other message that may be transmitted to the tokenized device 504 and/or to account-holder 502 over the initial purchase platform. For example, the redirection message may be an email sent to account-holder 502 that may be accessed at the initial purchase platform (e.g., a desktop browser) and as a text or push notification to tokenized device 504, simultaneously or upon a trigger action (e.g., account-holder 502 opening the email or account-holder 502 selecting an option within the email to have the request sent to tokenized device 504). Account-holder 502 may complete the transaction (1) using tokenized device 504.

In a third case, account-holder 502 initiates a transaction (6) using chip card 508, associated with Payment Account II, with web checkout as an initial purchase platform (e.g., using a desktop browser). Merchant 24 receives a checkout request for the initiated transaction and, according to particular transaction-security rules or configuration parameters imposed by merchant 24, transmits the checkout request (7) to PPR computing device 102. The checkout request includes at least an account-holder identifier and/or an account-holder account identifier, as well as an initial purchase platform identifier. PPR computing device 102 accesses a memory device to determine the purchase platform(s) available to account-holder 502. PPR computing device 102 uses the account-holder account identifier, which identifies Payment Account II as well as Payment Account I and the payment devices 504, 506 associated therewith, to determine that chip card 508 used to initiate the transaction is a chip card, and that tokenized device 504 is available as a purchase platform. In the example embodiment, transaction-security rules or configuration parameters imposed by merchant 24 indicate that both POS terminals and tokenized devices are recommended purchase platforms to web checkout.

PPR computing device 102 retrieves contact information for account-holder 502 associated with tokenized device 504 (and/or with the initial purchase platform, such as an email address). PPR computing device 102 transmits a redirection message (8) to merchant 24 including the contact information and an identifier of the recommended purchase platform (a POS terminal 510 at a brick-and-mortar location within a particular distance of account-holder 502, and tokenized device 504). Merchant 24 forwards the redirection message (9) to account-holder 502, more particularly, to tokenized device 504. The forwarded redirection message may be formatted as an email, text message, push notification, and/or any other message that may be transmitted to the tokenized device 504 and/or to account-holder 502 over the initial purchase platform. For example, the redirection message may be an email sent to account-holder 502 that may be accessed at the initial purchase platform (e.g., a desktop browser) and as a text or push notification to tokenized device 504, simultaneously or upon a trigger action (e.g., account-holder 502 opening the email or account-holder 502 selecting an option within the email to have the request sent to tokenized device 504). Account-holder 502 may complete the transaction (1) using tokenized device 504. Additionally or alternatively, the redirection message may be transmitted to the initial purchase platform and/or to tokenized device 504 with option for account-holder 502 to complete the transaction at POS terminal 510.

Figure 6:
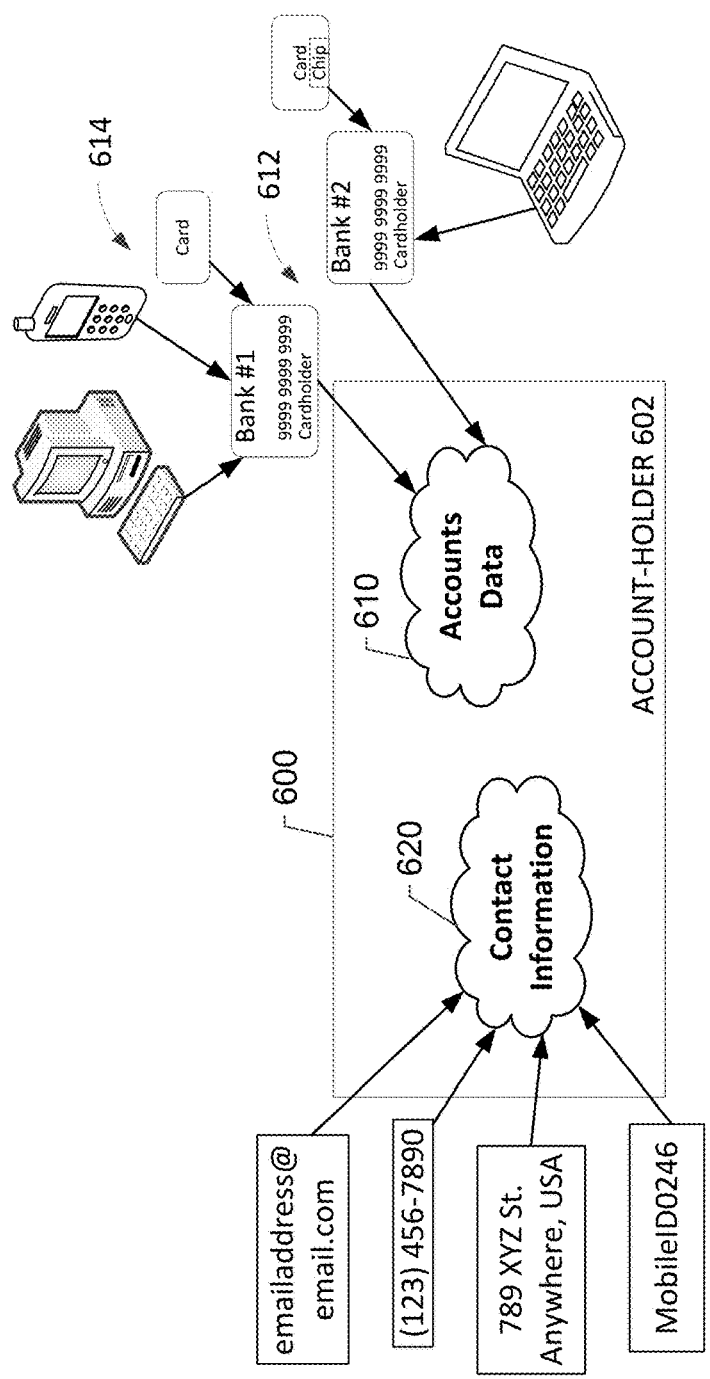

FIG. 6 is a diagram of an example database 600 including data associated with an account-holder 602 (who may be similar to account-holder 22, shown in FIG. 1, and/or account-holder 502, shown in FIG. 5). Database 600 may be similar to database 106, shown in FIG. 2. In the example embodiment, database 600 stores accounts data 610 associated with account-holder 602. Accounts data 610 includes data related to payment account(s) 612 associated with account-holder 602, as well as devices 614 somehow associated with any payment account(s) 612. Devices 614 may include, for example, user computing device(s) 104, shown in FIG. 2. In the example embodiment, devices 614 further include any payment card(s) associated with any payment account(s) 612. Account data 610 may include information about when, how, and/or how often devices 614 have historically been used during past payment card transactions. For example, accounts data 610 may include an Internet Protocol (IP) address, a media access control (MAC) address, or other identifier that may be used to identify particular devices 614. In some embodiments, account data 610 may include a fraudulent device status associated with each device 614 (e.g., whether the device has been involved in past fraudulent transactions).

Account data 610 further includes, for example, payment card authorization numbers (PANs), expiration dates, issuing bank names, associated security codes (e.g., a CVC2 code), account-holder name, tokens representing or otherwise associated with payment cards, and other data associated with payment cards 614, as well as any recognized secure element such as, for example, a token associated with a particular device and/or payment card 614 (e.g., as with MasterCard® Digital Enablement Service (MDES), or Digital Secure Remote Payments (DSRP)). In some embodiments, accounts data 610 includes whether and/or how often any of payment cards 614 were used with particular purchase platforms, such as card-present payment, E-Commerce, mobile payment using QR code, mobile payment using near-field communication (NFC), mobile payment using Bluetooth low energy (BLE), and/or mobile payment using another technology. For example, account-holder 602 may frequently use a non-chip payment card when making purchases over their laptop computer. In some embodiments, a merchant may impose a configuration parameter such that frequently used devices 614 and/or device pairings (e.g., a particular card 614 over a particular device 614) are considered recommended purchase platforms to less frequently used (or never before used) purchase platforms. Accordingly, a purchase platform redirection (PPR) computing device (e.g., PPR computing device 102, shown in FIG. 2) may access accounts data 610 in database 600 to determine a frequency of use of a particular device 614.

Database 600, in the example embodiment, also stores contact information 620 associated with account-holder 602. For example, contact information 620 may include an address of account-holder 602, one or more email addresses, one or more phone numbers, and one or more device IDs.

Figure 7:
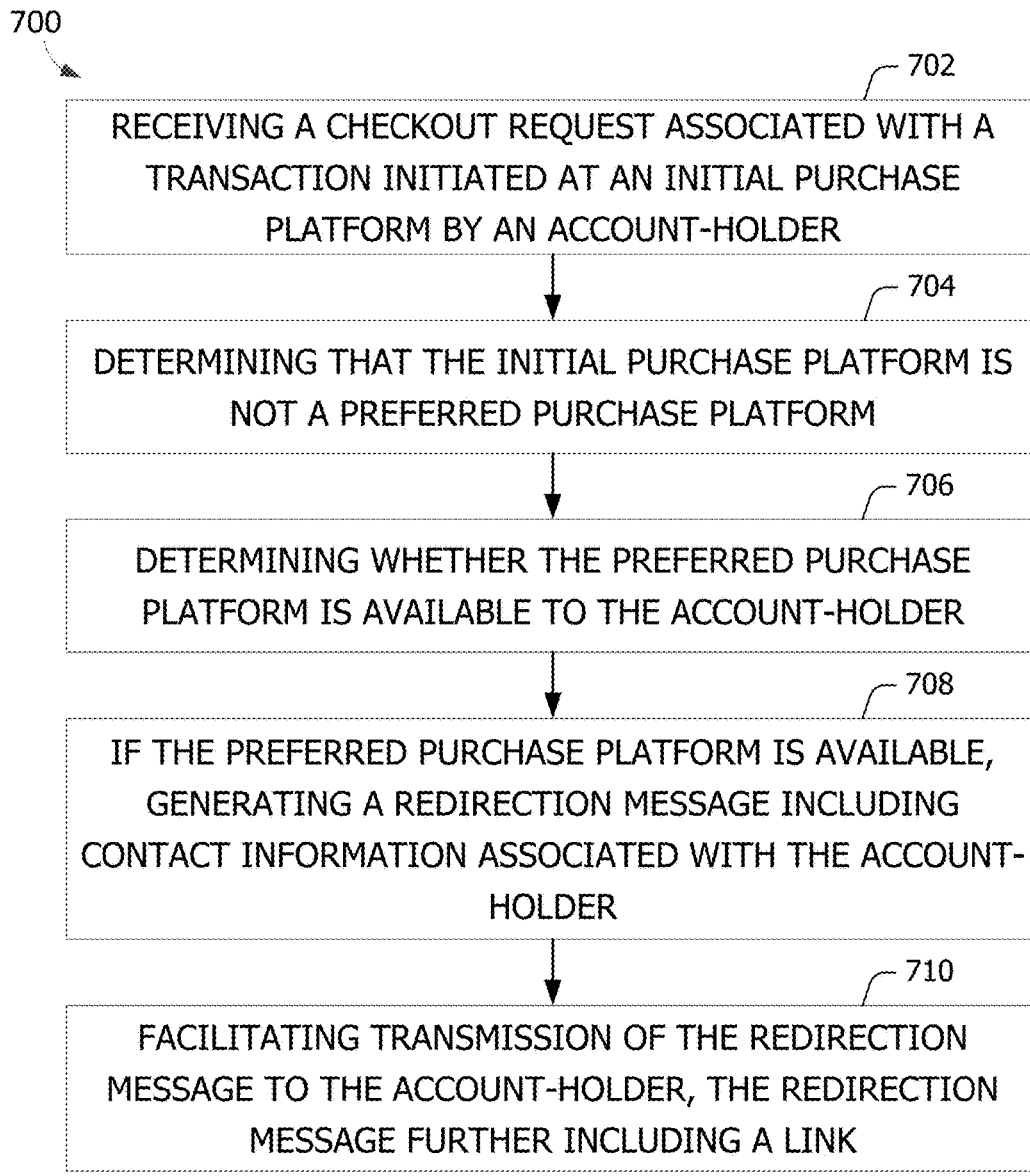

FIG. 7 is an example method 700 for facilitating cross-platform purchase redirection. In the example embodiment, method 700 is performed by a computing system such as purchase platform redirection computing device 102 (shown in FIG. 2). Method 700 includes receiving 702 a checkout request associated with a transaction initiated at an initial purchase platform by an account-holder. The checkout request includes a purchase platform identifier of the initial purchase platform and an account-holder account identifier of a payment account of the account-holder. Method 700 further includes determining 704 that the initial purchase platform is not a recommended purchase platform, and determining 706, using at least the account-holder account identifier, whether the recommended purchase platform is available to the account-holder. Method 700 also includes generating 708 a redirection message including contact information associated with the account-holder for the recommended purchase platform, if the recommended purchase platform is available. Method 700 still further includes facilitating transmission 710 of the redirection message to the account-holder. The redirection message further includes a link such that the account-holder may complete the transaction at the recommended purchase platform. Method 700 may include additional, fewer, or other steps, including those described elsewhere herein. For example, method 700 may further include storing configuration parameters defining the recommended purchase platform.

Figure 8:
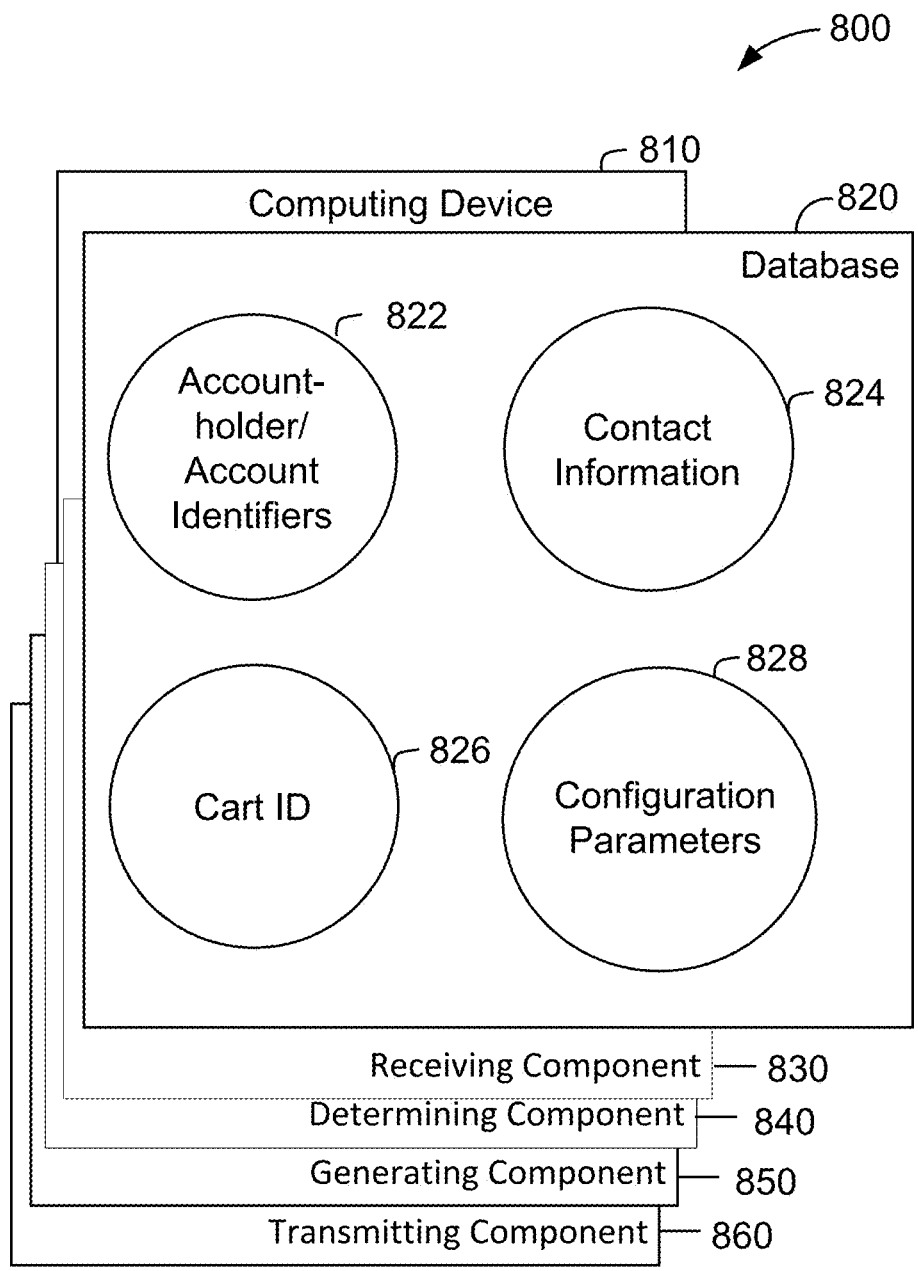

FIG. 8 shows a diagram of components 800 of an example computing device 810 that may be used in the secure shopping management system 100 shown in FIG. 2 to facilitate cross-platform purchase redirection. In some embodiments, computing device 810 is similar to purchase platform redirection (PPR) computing device 102 and/or merchant server 124 (both shown in FIG. 2). Database 820 is coupled to several separate components within computing device 810, which perform specific tasks.

In the example embodiment, database 820 includes account-holder identifiers and account-holder account identifiers 822, as well as contact information 824 associated with an account-holder. Account-holder/account identifiers 822 may be similar to accounts data 610, as shown and described with respect to FIG. 6. Contact information 824 may be similar to contact information 620, as shown and described with respect to FIG. 6. Database 820 further includes at least one cart ID 826, received in a checkout request, that may be temporarily (or permanently) stored, to associate an initiated checkout on an initial purchase platform with a subsequently initiated checkout on a recommended purchase platform. Database 820 may also include one or more transaction-security configuration parameters 828, which may be imposed or set by a merchant (e.g., merchant 24, shown in FIG. 1). Configuration parameters 828 may include the definition and/or ranking of recommended purchase platforms, as well as contact preferences (e.g., merchant server 124, shown in FIG. 2, is responsible for contacting the account-holder; or contact should be made using one specific format, such as an email). Database 820 may be similar to database 106, shown in FIG. 2, and/or database 600, shown in FIG. 6.

In the example embodiment, computing device 810 includes a receiving component 830. Receiving component 830 is configured to receive a checkout request associated with a transaction initiated at an initial purchase platform by an account-holder. The checkout request includes a purchase platform identifier of the initial purchase platform and an account-holder account identifier 822 of a payment account of the account-holder. Computing device 810 further includes a determining component 840. Determining component 840 is configured to determine that the initial purchase platform is not a recommended purchase platform, and determine, using at least the account-holder account identifier, whether the recommended purchase platform is available to the account-holder.

Computing device 810 also includes a generating component 850, configured to generate a redirection message including contact information 824 associated with the account-holder for the recommended purchase platform, if the recommended purchase platform is available to the account-holder. Computing device 810 further includes a transmitting component 840 configured to facilitate transmission of the redirection message to the account-holder. Transmitting component 840 may be additionally or alternatively configured to transmit the checkout request to another computing device 810. Transmitting component 840 may include formatting capabilities such that computing device 810 may format the redirection message and/or the checkout request appropriately, according to the receiver of the redirection message and/or the checkout request.

As will be appreciated based on the foregoing specification, the above-described embodiments of the disclosure may be implemented using computer programming or engineering techniques including computer software, firmware, hardware or any combination or subset thereof, wherein the technical effect is a flexible system for various aspects of fraud analysis of payment card transactions. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

In addition, although various elements of the purchase platform redirection (PPR) computing device are described herein as including general processing and memory devices, it should be understood that the PPR computing device is a specialized computer configured to perform the steps described herein for facilitating cross-platform purchase redirection.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

In addition, although various elements of the secure shopping management system are described herein as including general processing and memory devices, it should be understood that the purchase platform redirection computing device and merchant server are specialized computers configured to perform the steps described herein for facilitating cross-platform purchase redirection.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A purchase platform redirection (PPR) computing device, said PPR computing device comprising a processor communicatively coupled to a memory and at least one database, said processor programmed to:
receive a checkout request from a payment processing network associated with a transaction initiated at an initial purchase platform by an account-holder, the checkout request including a purchase platform identifier of the initial purchase platform and an account-holder account identifier of a payment account of the account-holder;
determine that the initial purchase platform is not a recommended purchase platform by comparing the initial purchase platform to a list of recommended purchase platforms stored within the at least one database;
identify a recommended purchase platform from the list of recommended purchase platforms stored within the at least one database;
determine, using at least the account-holder account identifier, whether the identified recommended purchase platform is available to the account-holder by retrieving from the at least one database a list of account-holder purchase platforms that includes purchase platforms previously used by the account-holder and comparing the identified recommended purchase platform to the list of account-holder purchase platforms;
when the recommended purchase platform is available, generate a redirection message including contact information associated with the account-holder for the recommended purchase platform; and
transmit the redirection message to the account-holder, the redirection message including a link wherein activation of the link by the account-holder causes an account-holder computing device, that includes the recommended purchase platform, to complete the transaction using the recommended purchase platform and the checkout request.

2. The PPR computing device of claim 1, wherein the redirection message is formatted as at least one of a text message, an email, and a push notification.

3. The PPR computing device of claim 1, wherein the redirection message further includes a cart ID associating the transaction initiated at the initial purchase platform with the transaction completed at the recommended purchase platform.

4. The PPR computing device of claim 1, wherein the recommended purchase platform is at least one of a tokenized device, a physical point-of-sale terminal, and a frequently used device.

5. The PPR computing device of claim 1, wherein the redirection message further includes an incentive for the account-holder to complete the transaction at the recommended purchase platform.

6. The PPR computing device of claim 1, wherein the checkout request is included in an authentication request transmitted from a merchant server and is formatted as a 3-DSecure® extension.

7. The PPR computing device of claim 1, wherein the processor is further programmed to store configuration parameters defining the recommended purchase platform.

8. A merchant server comprising a processor communicatively coupled to a memory, said merchant server configured to:
receive a checkout request from a payment processing network associated with a transaction initiated at an initial purchase platform by an account-holder, the checkout request including a purchase platform identifier of the initial purchase platform and an account-holder account identifier of a payment account of the account-holder;
transmit the checkout request to a purchase platform redirection (PPR) computing device, the PPR computing device configured to:
determine that the initial purchase platform is not a recommended purchase platform by comparing the initial purchase platform to a list of recommended purchase platforms stored within a database;
identify a recommended purchase platform from the list of recommended purchase platforms stored within the database;
determine, using at least the account-holder account identifier, whether the identified recommended purchase platform is available to the account-holder by retrieving from the database a list of account-holder purchase platforms that includes purchase platforms previously used by the account-holder, and comparing the identified recommended purchase platform to the list of account-holder purchase platforms;
when the recommended purchase platform is available, receive a redirection message from the PPR computing device including contact information for the account-holder associated with a recommended purchase platform; and
transmit, using the received contact information, the redirection message to the account-holder, the redirection message further including a link wherein activation of the link by the account-holder causes an account-holder computing device, that includes the recommend purchase platform, to complete the transaction using the recommended purchase platform and the checkout request.

9. The merchant server of claim 8, wherein the redirection message is formatted as at least one of a text message, an email, and a push notification.

10. The merchant server of claim 8, wherein the redirection message further includes a cart ID associating the transaction initiated at the initial purchase platform with the transaction completed at the recommended purchase platform.

11. A computer-based method for facilitating cross-platform purchase redirection, the method implemented using a purchase platform redirection (PPR) computer device including a processor, a memory, and at least one database, said method comprising:
receiving a checkout request from a payment processing network associated with a transaction initiated at an initial purchase platform by an account-holder, the checkout request including a purchase platform identifier of the initial purchase platform and an account-holder account identifier of a payment account of the account-holder;
determining that the initial purchase platform is not a recommended purchase platform by comparing the initial purchase platform to a list of recommended purchase platforms stored within the at least one database;
identify a recommended purchase platform from the list of recommended purchase platforms stored within the at least one database;
determining, using at least the account-holder account identifier, whether the identified recommended purchase platform is available to the account-holder by retrieving from the at least one database a list of account-holder purchase platforms that includes purchase platforms previously used by the account-holder, and comparing the identified recommended purchase platform to the list of account-holder purchase platforms;

when the recommended purchase platform is available, generating a redirection message including contact information associated with the account-holder for the recommended purchase platform; and transmitting the redirection message to the account-holder, the redirection message including a link wherein activation of the link by the account-holder causes an account-holder computing device, that includes the recommended purchase platform, to complete the transaction using the recommended purchase platform and the checkout request.

12. The computer-based method of claim 11, wherein transmitting the redirection message comprises formatting the redirection message as at least one of a text message, an email, and a push notification.

13. The computer-based method of claim 11, wherein the redirection message further includes a cart ID associating the transaction initiated at the initial purchase platform with the transaction completed at the recommended purchase platform.

14. The computer-based method of claim 11, wherein the recommended purchase platform is at least one of a tokenized device, a physical point-of-sale terminal, and a frequently used device.

15. The computer-based method of claim 11, further comprising storing, at the memory, configuration parameters defining the recommended purchase platform.

16. At least one non-transitory computer-readable storage media having computer-executable instructions embodied thereon, wherein when executed by at least one processor, the computer-executable instructions cause the processor to:

receive a checkout request from a payment processing network associated with a transaction initiated at an initial purchase platform by an account-holder, the checkout request including a purchase platform identifier of the initial purchase platform and an account-holder account identifier of a payment account of the account-holder;

determine that the initial purchase platform is not a recommended purchase platform by comparing the initial purchase platform to a list of recommended purchase platforms stored within a database;

identify a recommended purchase platform from the list of recommended purchase platforms stored within the database;

determine, using at least the account-holder account identifier, whether the identified recommended purchase platform is available to the account-holder by retrieving from the database a list of account-holder purchase platforms that includes purchase platforms previously used by the account-holder and comparing the identified recommended purchase platform to the list of account-holder purchase platforms;

when the recommended purchase platform is available, generate a redirection message including contact information associated with the account-holder for the recommended purchase platform; and transmit the redirection message to the account-holder, the redirection message including a link wherein activation of the link by the account-holder causes an account-holder computing device including, that includes the recommended purchase platform, to complete the transaction using the recommended purchase platform and the checkout request.

17. The computer-readable storage media of claim 16, wherein the redirection message is formatted as at least one of a text message, an email, and a push notification.

18. The computer-readable storage media of claim 16, wherein the redirection message further includes a cart ID associating the transaction initiated at the initial purchase platform with the transaction completed at the recommended purchase platform.

19. The computer-readable storage media of claim 16, wherein the recommended purchase platform is at least one of a tokenized device, a physical point-of-sale terminal, and a frequently used device.

20. The computer-readable storage media of claim 16, wherein the checkout request is included in an authentication request transmitted from a merchant server and is formatted as a 3-DSecure® extension.

* * * * *